UNITED STATES PATENT OFFICE.

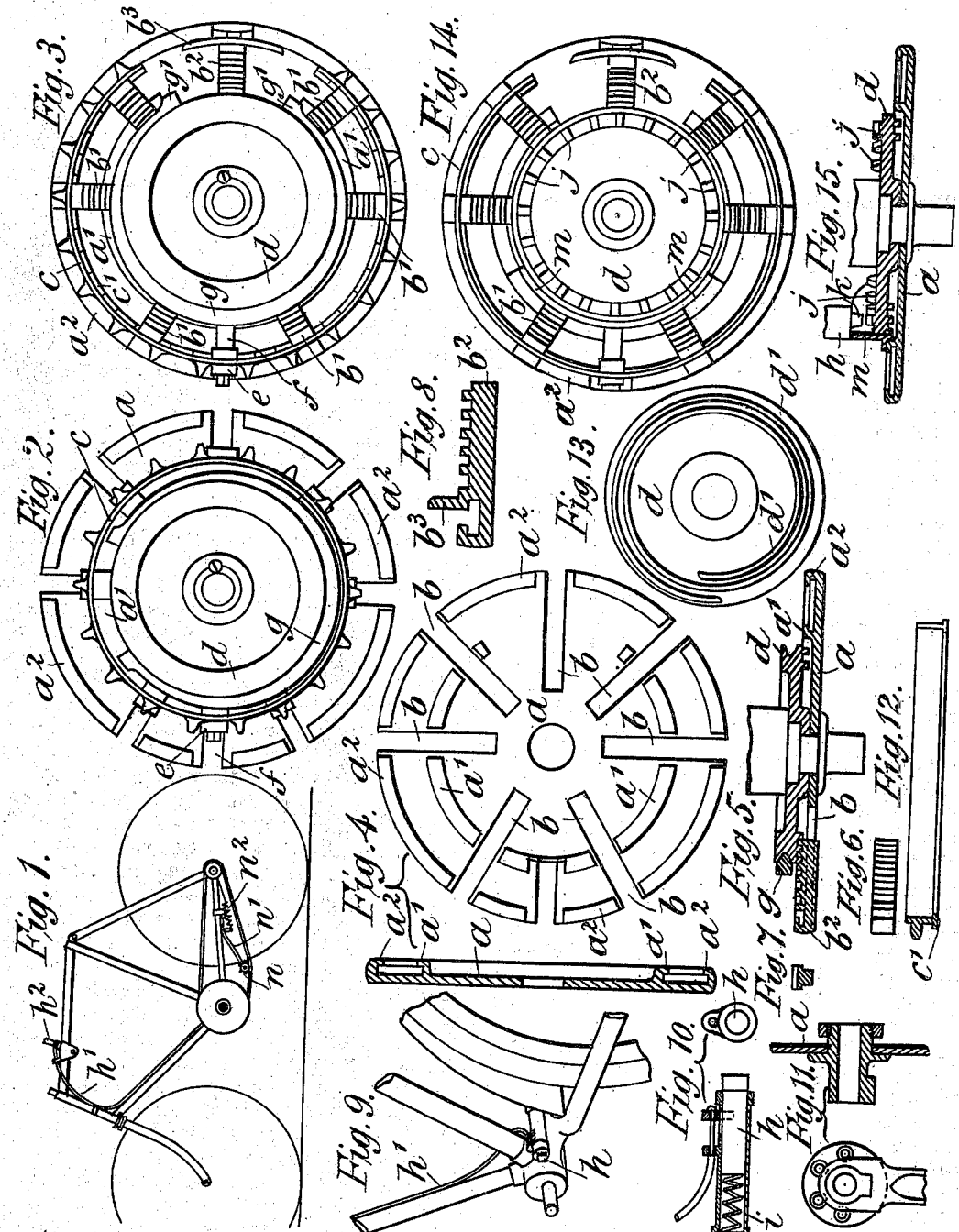

WILLIAM DYSON WANSBROUGH, OF LINCOLN, ENGLAND.

TWO-SPEED GEAR-WHEEL.

SPECIFICATION forming part of Letters Patent No. 709,381, dated September 16, 1902.

Application filed October 4, 1901. Serial No. 77,604. (No model.)

*To all whom it may concern:*

Be it known that I, WILLIAM DYSON WANSBROUGH, a subject of the King of Great Britain and Ireland, residing at Spring Hill House, Lincoln, in the county of Lincoln, England, have invented new and useful Improvements in Two-Speed Gear-Wheels, of which the following is a specification.

This invention relates to a two-speed gear-wheel particularly suitable for use in connection with velocipedes or other mechanically-propelled vehicles, while it is also suitable for use in connection with steam-engine governors and other driven mechanism, the object being, as applied to velocipedes, to provide a simple and efficient two-speed gear taking the form of a chain-wheel and the effective diameter of which is capable of being altered, so as to provide in one combination of mechanical parts practically two chain-wheels of different diameters, which allow of the machine being driven at two different speeds with the same rate of pedal rotation. This improved two-speed chain-wheel consists of few and simple parts, is capable of being readily altered at will while the machine is in motion, and when driving has no parts revolving relatively to itself, the whole of the parts in the combination revolving together as an ordinary fixed wheel.

It is known from experience that the absence of certain teeth in the chain-wheel causes no ill effects in the working or driving of the same provided there are always a sufficient number of teeth in engagement with the chain to carry on the work, and taking advantage of this fact a chain-wheel constructed according to this invention consists of a divided flexible chain-ring provided with teeth upon its outer surface, which is arranged in what may be termed a "back plate," provided with an inner and outer annular flange. This chain-ring is secured to the extremities of a sufficient number of radially-moving jaws operated through the medium of a spirally-threaded disk, by means of which the said jaws may be driven in an outward direction radially from the center of the plate, thereby forcing the flexible chain-ring against, and a flanged portion of the same under, the outer annular flange in the aforesaid back plate, and the gap between the ends of the flexible chain-ring is bridged over by means of a curved metal plate, forming an arc of the larger chain-wheel, which is secured to or formed integrally with one of the aforesaid radially-moving jaws. In this position the larger driving chain-wheel is provided, representing the higher-driving gear, while in order to reduce the diameter of the chain-wheel to produce the lower-driving gear the aforesaid chain-ring is contracted until it lies against, and its flanged portion under, the inner annular flange of the aforesaid back plate, which is effected by means of the aforesaid radially-moving jaws operated through the medium of the spirally-threaded disk, and in this position of the chain-rings its ends abut and the curved plate carried by or forming a part of one of the aforesaid radially-moving jaws then lies within the chain-ring. It will thus be seen that the principle of this invention is that a flexible divided ring having a given number of teeth around its circumference may be disposed by suitable means around a larger circumference and that while so disposed around the larger circumference it will, though only possessing the number of teeth of a chain-wheel of the smaller diameter, in all ways act as though it possessed the full number of teeth contained in a chain-wheel of the larger diameter.

In order to expand the chain-ring to its largest diameter while riding, it is only necessary to arrest the motion of the spirally-threaded disk, which normally revolves with and as a part of the chain-wheel when the action of pedaling forward revolves the back plate carrying the chain-ring and screws out the radially-moving jaws, so as to force the chain-ring out to its maximum diameter, while to reduce the diameter of the chain-ring it is only necessary to revolve the pedals in the reverse direction, as in the action of back-pedaling, (it being assumed that the machine is fitted with a "free wheel,") when the radially-moving jaws are drawn in toward the center of the back plate, carrying with them the chain-ring, which is thus contracted till its ends abut.

Means is provided for arresting the motion of the spirally-threaded disk when required and for releasing it for a certain portion of each revolution of the chain-wheel when changing the gear, as hereinafter more fully set forth.

In order that this invention may be more fully understood, it will now be described with reference to the accompanying drawings, in which—

Figure 1 is a diagrammatic view of a bicycle having this invention applied thereto. Fig. 2 is an elevation of the chain-wheel contracted for the lower gear. Fig. 3 is a similar view showing the chain-ring expanded, representing the higher gear. Fig. 4 shows a front view and a section of the back plate. Fig. 5 is a sectional view of the back plate, showing one jaw and the spiral disk. Fig. 6 shows one of the jaws in plan. Fig. 7 is a cross-section of one of the said jaws. Fig. 8 is a longitudinal section of the jaw carrying the bridge-piece. Fig. 9 is a diagrammatic view of the lower part of a cycle-frame with the chain-wheel removed, showing the arrangement of a spring-operated bolt by means of which the rotary motion of the spiral disk may be arrested. Fig. 10 is a side view, partially in section, and an end view of the bolt. Fig. 11 is a front view and a cross-section of a boss which is secured to the back plate and receives the crank. Fig. 12 is a cross-section through the chain-ring. Fig. 13 is an under side view of the spirally-threaded disk. Figs. 14 and 15 illustrate in side elevation and cross-section, respectively, an alternative arrangement for arresting the motion of the spirally-threaded disk.

This improved two-speed gear-wheel consists of a back plate $a$, provided with an inner annular flange $a'$ and an outer annular flange $a^2$, between which is arranged a flexible divided chain-ring $c$, formed with a flanged portion $c'$ cut or slotted at intervals to allow of the chain-ring bending. The back plate $a$ is provided with a number of radial slots $b$, within which radially-moving jaws $b'$ are arranged, these jaws at their extremities engaging the chain-ring $c$ in such a manner as to allow it to slide through them while being expanded or contracted, while one of the said jaws $b^2$ carries the bridge-piece $b^3$, hereinbefore referred to.

The whole of the jaws are simultaneously operated after the manner of an American lathe-chuck by means of a spirally-threaded disk $d$, the thread $d'$ of which engages with the teeth formed on the upper surfaces of the jaws $b'$ and $b^2$, while connection between the chain-ring $c$ and the back plate $a$ is made by means of a block $e$, suitably secured to the chain-ring and working up and down in the slot $f$, formed in the back plate $a$ at a point diametrically opposite to the divided ends of the chain-ring $c$.

In order to expand the chain-ring $c$ to its maximum diameter, which provides the higher gear, it is only necessary to arrest the motion of the screw-threaded disk $d$, revolve the back plate, and with it the chain-ring $c$ in a forward direction, when the jaws $b'$ are driven radially in an outward direction, forcing the chain-ring into engagement with the outer annular flange $a'$, the jaw $b^2$, with its curved plate $b^3$, coming forward and forming a bridge-piece designed to carry the chain over the gap between the separated extremities of the chain-ring, while in order to contract the chain-ring to provide the lower gear it is only necessary after arresting the motion of the spirally-threaded disk $d$ to revolve the back plate, and with it the chain-ring, in the reverse direction, which has the effect of causing the jaws to simultaneously slide in toward the center of the plate, thereby contracting the chain-ring and drawing it closely into engagement with the inner annular flange $a'$.

As it is impossible for the chain-ring $c$ to expand while the teeth of its extremities are in engagement with the inextensible chain, and as such expansion can only take place during that portion of a revolution when its extremities are not meshing with the chain, it is necessary that the spirally-threaded disk $d$ should only be stopped for a portion of each revolution. For this purpose a C-shaped brake-strap $g$ is sprung with some degree of force around the grooved outer periphery of the disk $d$, and the rotation of the latter is prevented by means of a spring-operated bolt $h$, Figs. 9 and 10, normally retained out of contact with the chain-wheel by means of a wire $h'$, operated through the medium of a hand-lever $h^2$, so that upon pushing over the hand-lever $h^2$ the bolt $h$ is driven forward by the spring $i$ and enters between the extremities $g'$ $g'$ of the brake-strap $g$, thereby arresting the motion of the spirally-threaded disk $d$ until the resistance of the further expansion of the chain-ring, caused by its divided extremities engaging the chain, is greater than the frictional resistance between the brake-strap $g$ and the disk $d$, when the said brake-strap $g$ slips and the disk $d$ revolves with the chain-ring until its divided extremities are again free of the chain. The brake-strap $g$ also forms a safety arrangement, allowing the bolt to be put into engagement with the same at any speed without injurious shock, while when the chain-ring is fully expanded the brake-ring continues to slip around the disk $d$ until the bolt is withdrawn.

Figs. 14 and 15 illustrate an alternative arrangement for arresting the motion of the disk $d$ for allowing the chain-ring to revolve without expanding for a part of each revolution and without the employment of a brake-strap, such as $g$, and according to this arrangement the disk $d$ is provided with a circular series of teeth $j$, which are directly engaged by the suitably-shaped extremity $k$ of the bolt $h$ when the latter is released, so as to arrest the motion of the disk $d$, Fig. 14, while the bolt $h$ is lifted out of contact with the teeth $j$ for a sufficient part of each revolution by means of a curved upstanding flange $m$, carried by the back plate $a$, which comes into direct engagement with the bolt $h$, as shown in Fig. 15, and lifts the extremity $k$ out of engagement with the teeth $j$, so as to allow the disk $d$ to revolve with the chain-ring for the required part of each revolution.

The chain is kept sufficiently taut in all positions of the chain-ring $c$ by means of a jockey-wheel $n$, carried on the arm $n'$, secured to the frame of the machine and operated by means of the spring $n^2$. The bolt $h$ is preferably operated by means of a wire; but any suitable arrangement of rods and levers or other mechanical means may be employed for this purpose.

Although this two-speed gear-wheel is particularly designed for use in connection with velocipedes, yet it may be employed in connection with other chain-driven mechanism where a two-speed gear is required, while as applied to velocipedes it is possessed of particular advantages, inasmuch as it is applicable to existing machines, the chain-wheel is circular at both speeds, the gear can be readily altered while riding, and at both speeds it is practically a fixed chain-wheel—that is to say, has no parts in motion relatively to itself.

Having now described my invention, what I claim as new, and desire to secure by Letters Patent, is—

1. In an adjustable wheel, the combination, with a back plate, of radially-movable jaws carried by the said back plate, a flexible divided ring secured to one of the said jaws and slidable in certain of the remaining jaws, and means for moving the said jaws simultaneously to expand and contract the said ring, substantially as set forth.

2. In an adjustable wheel, the combination, with a back plate, of radially-movable jaws carried by the said back plate, a flexible divided ring secured to one of the said jaws and slidable in certain of the remaining jaws, a bridge-piece secured to one of the said jaws in the gap of the said ring, and means for moving the said jaws simultaneously to expand and contract the said ring and change the position of the said bridge-piece, substantially as set forth.

3. In an adjustable wheel, the combination, with a back plate provided with radial slots and two concentric stop-flanges, of jaws slidable in the said slots, a flexible divided ring secured to one of the said jaws and slidable in certain of the remaining jaws and between the said flanges, and means for sliding the said jaws simultaneously, substantially as set forth.

4. In an adjustable wheel, the combination, with a back plate, of radially-movable jaws carried by the said back plate and provided with teeth, a flexible divided ring secured to one of the said jaws and slidable in certain of the remaining jaws, and an independently-revoluble disk revoluble upon the same axis as the said back plate and provided with a spiral thread which engages with the said teeth and operates to slide the said jaws simultaneously, substantially as set forth.

5. In an adjustable wheel, the combination, with a back plate, and a disk provided with a spiral thread and normally revolving with the said back plate; of radially-movable jaws carried by the said back plate and provided with teeth which engage with the said spiral thread, a flexible divided ring secured to one of the said jaws and slidable in certain of the remaining jaws, driving devices for revolving the said back plate continuously, and means for arresting the motion of the said disk intermittently, substantially as set forth.

In testimony whereof I affix my signature in presence of two witnesses.

WILLIAM DYSON WANSBROUGH.

Witnesses:
JAMES ODAM,
C. W. PAULGOR.